United States Patent
Zhang

(10) Patent No.: US 9,426,498 B2
(45) Date of Patent: Aug. 23, 2016

(54) REAL-TIME ENCODING SYSTEM OF MULTIPLE SPATIALLY SCALED VIDEO BASED ON SHARED VIDEO CODING INFORMATION

(75) Inventor: Lei Zhang, Palo Alto, CA (US)

(73) Assignee: BROADCOM CORPORATION, Irvine, CA (US)

(*) Notice: Subject to any disclaimer, the term of this patent is extended or adjusted under 35 U.S.C. 154(b) by 862 days.

(21) Appl. No.: 13/545,242

(22) Filed: Jul. 10, 2012

(65) Prior Publication Data

US 2014/0015922 A1  Jan. 16, 2014

(51) Int. Cl.
*H04N 7/12* (2006.01)
*H04N 21/2343* (2011.01)
*H04N 19/56* (2014.01)
*H04N 19/513* (2014.01)
*H04N 19/33* (2014.01)

(52) U.S. Cl.
CPC .......... *H04N 21/2343* (2013.01); *H04N 19/33* (2014.11); *H04N 19/513* (2014.11); *H04N 19/56* (2014.11); *H04N 21/23439* (2013.01); *H04N 21/234363* (2013.01)

(58) Field of Classification Search
None
See application file for complete search history.

(56) References Cited

U.S. PATENT DOCUMENTS

| | | | |
|---|---|---|---|
| 6,011,901 A | 1/2000 | Kirsten et al. | |
| 6,496,216 B2 | 12/2002 | Feder et al. | |
| 6,535,238 B1 | 3/2003 | Kressin | |
| 6,538,656 B1 | 3/2003 | Cheung et al. | |
| 6,573,905 B1 | 6/2003 | MacInnis et al. | |
| 6,614,843 B1 | 9/2003 | Gordon et al. | |
| 6,636,222 B1 | 10/2003 | Valmiki et al. | |
| 6,647,061 B1 | 11/2003 | Panusopone et al. | |
| 6,661,422 B1 | 12/2003 | Valmiki et al. | |
| 6,757,005 B1 | 6/2004 | Elbaz et al. | |
| 6,768,774 B1 | 7/2004 | MacInnis et al. | |
| 6,798,420 B1 | 9/2004 | Xie | |
| 6,853,385 B1 | 2/2005 | MacInnis et al. | |

(Continued)

FOREIGN PATENT DOCUMENTS

CN 102055964 A 5/2011
CN 102150425 A 8/2011

(Continued)

OTHER PUBLICATIONS

Li-Fu Ding et al. ("Content-Aware Prediction Algorithm With Inter-View Mode Decision for Multiview Video Coding", EPO Form 2906 01.91 TRI IEEE Transactions on Multimedia, IEEE Service Center, Piscataway, NJ, US, vol. 10, No. 8, Dec. 1, 2008, pp. 1553-1564, XP011346564, ISSN: 1520-9210, 001: 10.1109ITMM.2008.2007314).*

(Continued)

*Primary Examiner* — Sath V Perungavoor
*Assistant Examiner* — Dakshesh Parikh
(74) *Attorney, Agent, or Firm* — Foley & Lardner LLP

(57) ABSTRACT

In one embodiment, a method comprising receiving at a single encoding engine an input video stream having one or more pictures of a first size; and generating by the single encoding engine, in parallel, plural encoded streams, a first of the encoded streams comprising one or more pictures of the first size and a second of the encoded streams comprising one or more pictures of a second size that is smaller than the first size, the encoding of the second stream based on sharing video coding information used in encoding the first encoded stream.

17 Claims, 7 Drawing Sheets

(56) References Cited

U.S. PATENT DOCUMENTS

| | | |
|---|---|---|
| 6,870,538 B2 | 3/2005 | MacInnis et al. |
| 6,871,006 B1 | 3/2005 | Oguz et al. |
| 6,975,324 B1 | 12/2005 | Valmiki et al. |
| 7,058,965 B1 | 6/2006 | Gordon et al. |
| 7,071,944 B2 | 7/2006 | MacInnis et al. |
| 7,085,322 B2 | 8/2006 | Ngai et al. |
| 7,110,006 B2 | 9/2006 | MacInnis et al. |
| 7,230,987 B2 | 6/2007 | Demas et al. |
| 7,256,790 B2 | 8/2007 | Valmiki et al. |
| 7,274,740 B2 | 9/2007 | van Beek et al. |
| 7,277,099 B2 | 10/2007 | Valmiki et al. |
| 7,313,593 B1 | 12/2007 | Pulito et al. |
| 7,365,752 B2 | 4/2008 | Xie |
| 7,446,774 B1 | 11/2008 | MacInnis et al. |
| 7,533,402 B2 | 5/2009 | Demas et al. |
| 7,555,715 B2 | 6/2009 | Randall et al. |
| 7,613,727 B2 | 11/2009 | Visharam et al. |
| 7,626,518 B2 | 12/2009 | Hussain et al. |
| 7,626,521 B2 | 12/2009 | Hussain et al. |
| 7,656,326 B2 | 2/2010 | Hussain et al. |
| 7,659,900 B2 | 2/2010 | MacInnis et al. |
| 7,667,715 B2 | 2/2010 | MacInnis et al. |
| 7,809,061 B1 * | 10/2010 | Sarna ............ H04N 21/234327 375/240.16 |
| 7,848,430 B2 | 12/2010 | Valmiki et al. |
| 7,921,445 B2 | 4/2011 | Amir et al. |
| 7,991,049 B2 | 8/2011 | MacInnis et al. |
| 8,018,850 B2 | 9/2011 | van Beek et al. |
| 8,022,966 B2 | 9/2011 | MacInnis et al. |
| 8,050,330 B2 | 11/2011 | Demas et al. |
| 8,189,678 B2 | 5/2012 | Valmiki et al. |
| 2011/0032988 A1 * | 2/2011 | Chiba ................. H04N 19/176 375/240.12 |
| 2011/0170608 A1 * | 7/2011 | Shi ...................... H04N 19/147 375/240.24 |

FOREIGN PATENT DOCUMENTS

| | | |
|---|---|---|
| EP | 1 615 447 A1 | 1/2006 |
| EP | 2 343 898 A1 | 1/2010 |
| TW | 201112773 | 4/2011 |

OTHER PUBLICATIONS

Jiao Wang, et al., An Efficient Motion Estimation Method for H.264-Based Video Transcoding with Arbitrary Spatial Resolution Conversion., Dec. 31, 2007, pp. 1-74, Ontario, Canada, located at http://hdl.handle.net/10012/3133.

Ishfaq Ahmad, et al., "Video Transcoding: An overview of Various Techniques and Research Issues", IEEE Transactions on Multimedia, IEEE Service Center, Piscataway, NJ, US, vol. 7, No. 5, Oct. 1, 2005, pp. 793-804, Document No. XP011139259.

Jan de Cock, et al., "Efficient Spatial Resolution Reduction Transcoding for H.264/AVC", Image Processing, 2008, ICIP 2008, 15th IEEE International Conference, Piscataway, NJ, US, Oct. 12, 2008, pp. 1208-1211, Document No. XP0131374225.

European Search Report in co-pending, related EP Application No. 13003208.9, mailed Nov. 20, 2013.

Ding et al., Content-Aware Prediction Algorithm With Inter-View Mode Decision for Multiview Video Coding, IEEE Transactions on Multimedia, vol. 10, No. 8, Dec. 2008, 12 pages.

Summons to Attend Oral Proceedings pursuant to Rule 115(1) EPC for EP Application No. 13003208.9, mailed Dec. 9, 2014, 4 pages.

Office Action for Taiwanese Patent Application No. 102122736, dated Jun. 4, 2015, 6 pages.

Office Action for Taiwanese Patent Application No. 102122736, dated Nov. 12, 2015, 6 pages.

Office Action from Chinese Patent Office for Application No. 201310269676.6, dated Mar. 28, 2016, 12 pages.

* cited by examiner

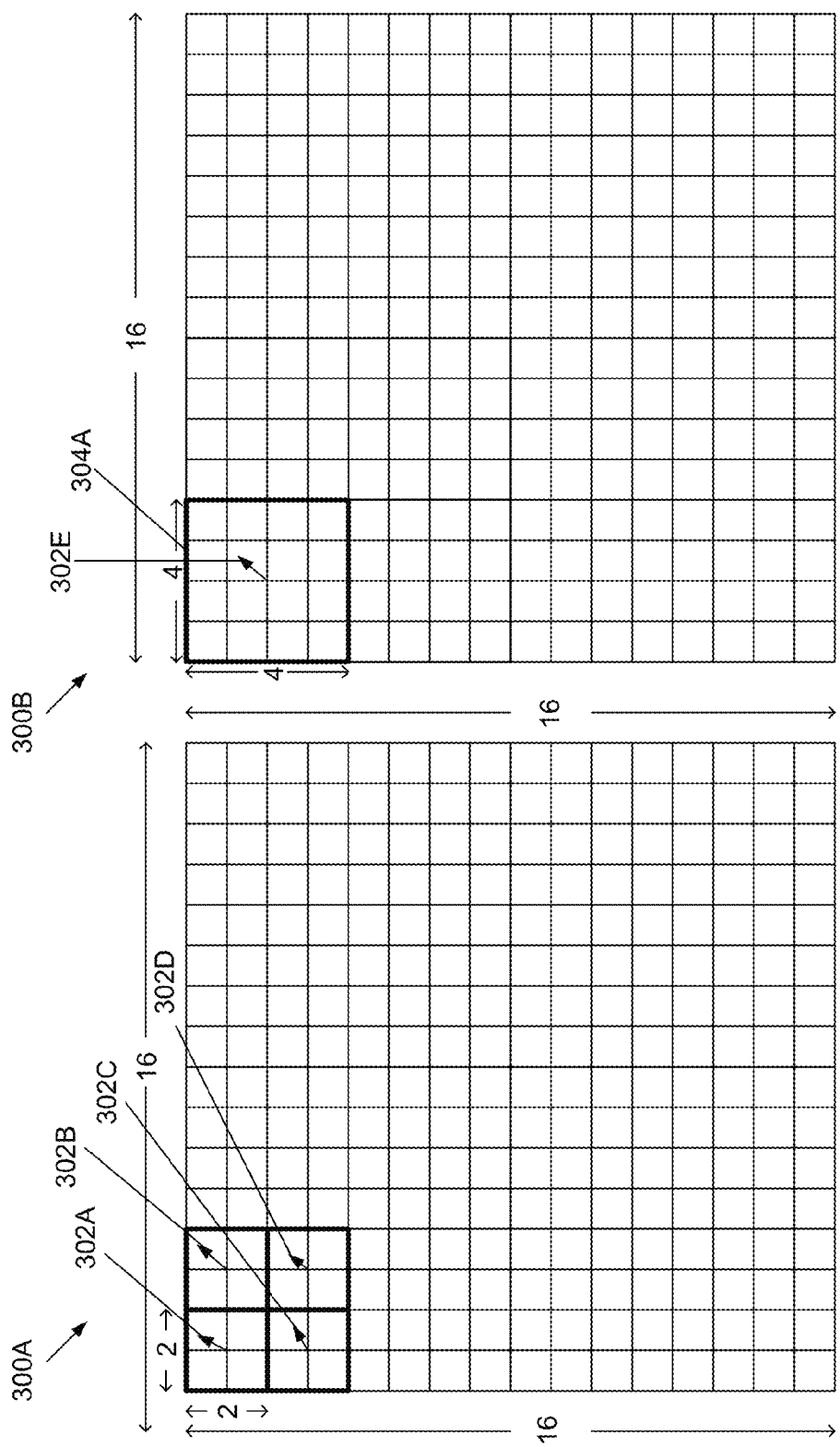

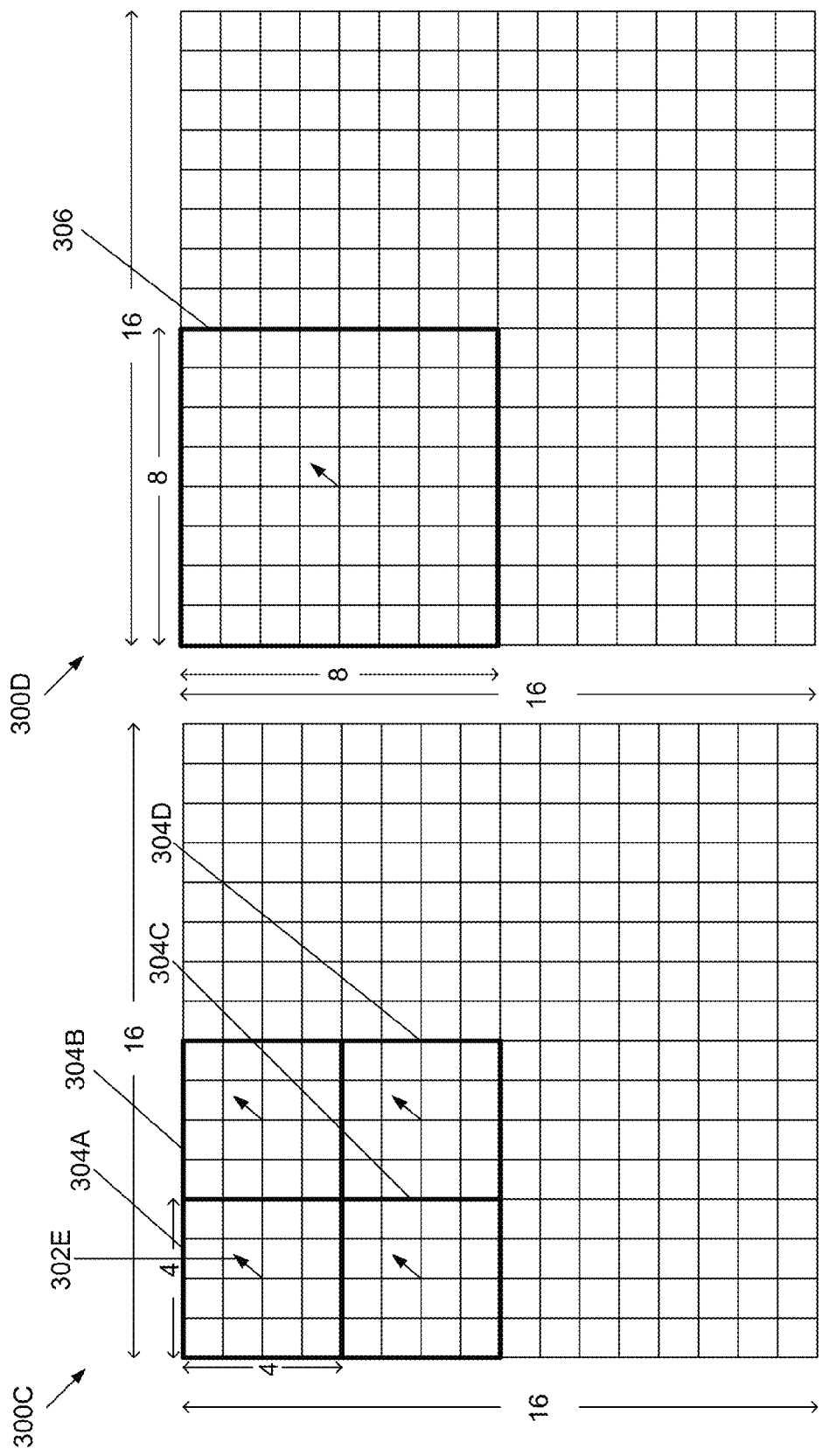

US 9,426,498 B2

REAL-TIME ENCODING SYSTEM OF MULTIPLE SPATIALLY SCALED VIDEO BASED ON SHARED VIDEO CODING INFORMATION

CROSS-REFERENCE TO RELATED APPLICATIONS

This application is related to copending U.S. utility patent application entitled "Systems and Methods for Generating Multiple Bitrate Streams Using a Single Encoding Engine," filed on May 31, 2012 and accorded Ser. No. 13/484,478, and copending U.S. utility application entitled "Real-Time Video Coding System of Multiple Temporally Scaled Video and of Multiple Profile and Standards Based on Shared Video Coding Information," filed on the same date as the present disclosure.

TECHNICAL FIELD

The present disclosure is generally related to video encoding/transcoding.

BACKGROUND

Advances in video technology have led to a multitude of mechanisms by which a consumer may receive and enjoy video (and audio) presentations. For instance, a signal may be received at an electronic appliance at a home or place of business via satellite or cable, and distributed as a high bit rate, high definition (HD) stream for viewing in one room over a multimedia over coax alliance (MoCA) network, or as a low bit rate stream for viewing on a portable device over wireless, or as streaming content to another client device for place-shifted viewing over the Internet. Various approaches to achieving these functions continue to evolve as technology improves.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A-3D are block diagrams that illustrate merging of motion vectors.

DETAILED DESCRIPTION

Figure 1:
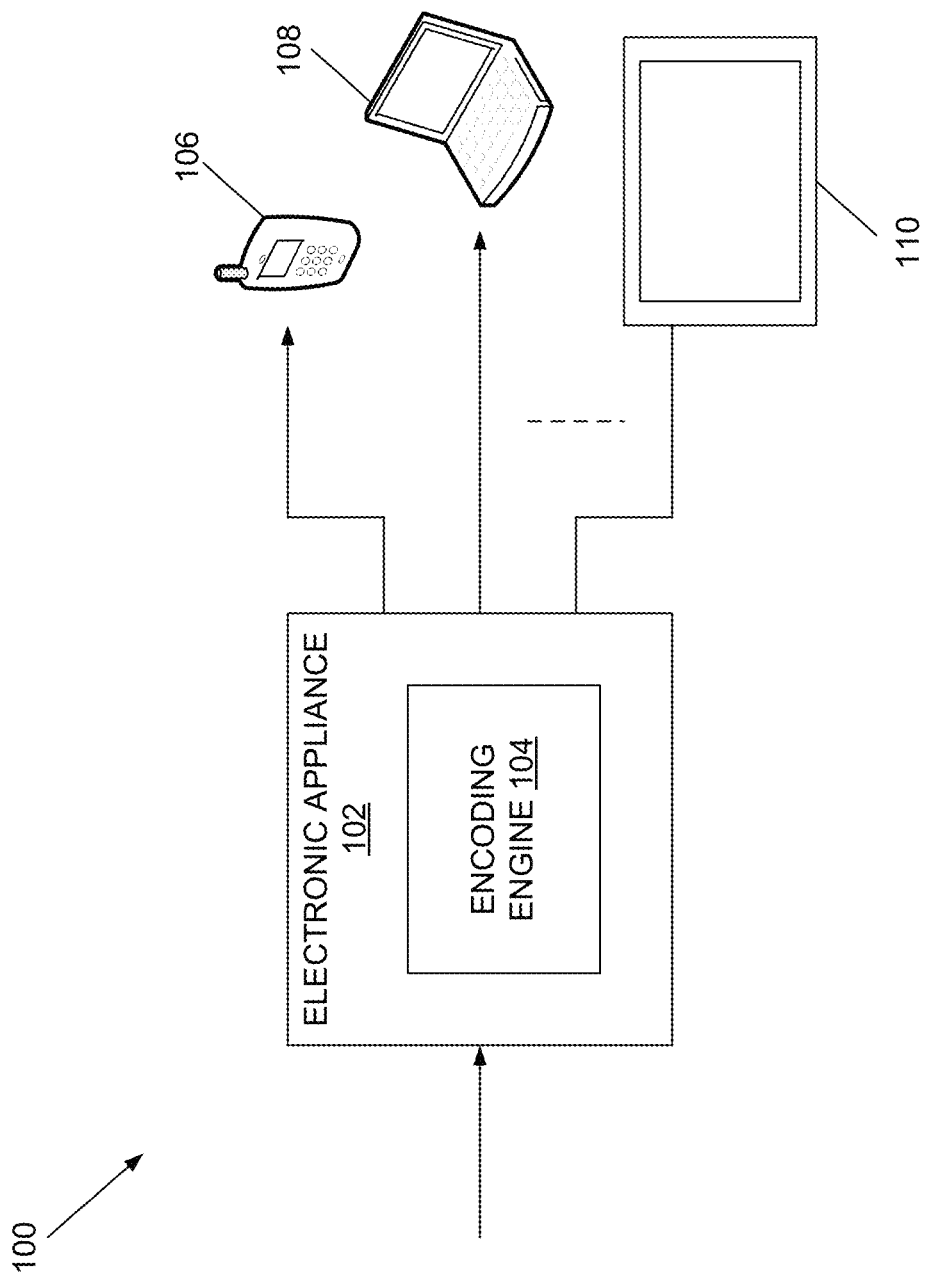
FIG. 1 is a block diagram of an example environment in which an embodiment of a video coding system may be employed.

Disclosed herein are certain embodiments of video coding systems and methods that include a single encoding engine that shares video coding information among plural, real-time, parallel encoding operations to provide multiple encoded streams of spatially scaled videos of the same source. The video coding information includes motion vector search results (e.g., motion vectors, partitions of one coding unit or one macroblock, motion vector search resolution, etc.) and in some embodiments, mode decisions, such as inter or intra prediction mode for the coding unit (a basic coding unit in the emerging HEVC video compression standard) or macroblock (a basic coding unit in the MPEG2, AVC, VC-1, VP8 video compression standards), and intra prediction direction if intra prediction is selected for the coding unit or macroblock (the two terms coding unit and macroblock interchangeably used in this application). Reference herein to encoding includes encoding (e.g., based on receipt of a non-compressed stream) and transcoding (e.g., based on receipt of a compressed stream and compression operations with or without decompression).

In one embodiment of a video coding system corresponding to multiple spatially scaled streams of the same source, a single encoding engine is used to generate one or more compressed streams of the original input video and one or more down-scaled versions of the original input video in real-time and encoded by sharing the motion vector search result for inter-prediction, and/or the intra prediction mode for intra-prediction, and/or the selection between inter or intra prediction for the coding unit or macroblock when encoding videos of different sizes from the same input.

In conventional systems, multiple instances of the same encoding engine may be employed to support encoding of both the original input video and the scaled version of the input video in parallel in real-time, which may increase the silicon cost, or encoding the original input video and the scaled version by the same engine at a speed of multiple of the real-time video rate, which increases the circuit clock rate and power consumption. Motion vector searching is one of the functions that consume most processing resources as well as the DRAM bandwidth cost, whether it is implemented in hardware or software. It is also one of the functions that may affect the coding quality significantly if the search range is not sufficient. Sharing the motion search results among the same video of different sizes, as performed by certain embodiments of video coding systems, may save silicon and DRAM cost.

Having summarized features of certain embodiments of video coding systems, reference will now be made in detail to the description of the disclosure as illustrated in the drawings. While the disclosure will be described in connection with these drawings, there is no intent to limit it to the embodiment or embodiments disclosed herein. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Referring to FIG. 1, shown is a block diagram of an example environment in which an embodiment of a video coding system may be employed. One having ordinary skill in the art should appreciate in the context of the present disclosure that other systems where encoding may be utilized are contemplated, and hence FIG. 1 is merely for illustrative purposes, with other variations contemplated to be within the scope of the disclosure. The environment depicted in FIG. 1 comprises a home entertainment system 100 comprising an electronic appliance 102, an encoding engine 104 embedded within the electronic appliance 102, and a plurality of multimedia devices, including a smartphone 106, a laptop 108, and a television 110. In one embodiment, the electronic appliance 102 is configured as a home media gateway set-top box, where the same input video from cable or satellite (or terrestrial) is encoded by the single encoding engine 104 to different bit rates simultaneously in real-time, such as a high bit rate, high definition (HD) stream for viewing on the television 110 in a bedroom over MoCA and a low bit rate stream for a portable device(s) (e.g., smartphone 106, cell phone, PDA, etc.) over wireless, and/or streaming to another client (e.g., the laptop 108) for place-shifted viewing over the Internet. In some embodiments, the electronic appliance 102 may be embodied as a server device, router, computer, television, among other electronic devices.

The low bit rate stream may be a lower valued video characteristic than the original input video provided to the input of the electronic appliance 102 (e.g., smaller picture size or lower resolution video, such as a stream at half of the picture width and height of the original input). Multiple streams of the same video content with different picture sizes are particularly useful in a heterogeneous video consumption environment. For instance, with multiple screens, larger picture sizes or higher resolution corresponding to a live sports game at, say, 1920×1080, may viewed on the big screen 110 in a living room, and in the meantime, the same game at a lower picture size or resolution, such as 960×540, can be viewed on a portable device (e.g., smartphone 106, iPAD, etc.) in a kitchen or in the backyard via WiFi using a home wireless router, or can be viewed at 960×540 on a display screen in a vehicle via a 3G/4G wireless IP network when a user may have to drive away in the middle of the game while his or her family may still watch the game at home. A seamless consumption of the same video content on multiple screens at different places at the same time may require the real-time encoding engine 104 to generate multiple picture size video streams with the same input video at the same time.

The real-time multi-rate video encoding engine 104 also has one or more applications in wireless video display, such as video-over-WiFi or video-over-WiGig, where the available bandwidth for a video transmission rate may change very quickly due to possible blockage of the transmission path between a transmitter and a receiver by a moving object.

Certain embodiments of a video coding system may provide a benefit to the quality of video services if the transmitter that normally comprises, for instance, the video encoding engine 104, generates both high and low bit rate streams. The low bit rate stream may be the same video at a smaller picture size than the original input stream, and thus meets a lower transmission rate when the available bandwidth drops. Further, when spatial scaling is employed, the low bit rate stream may be the down-scaled video from the original input stream to achieve possibly high compression quality at a low bit rate when the receiver can scale it up to the original input size.

When spatial scaling is employed, the real-time multi-rate video encoding engine 104 may find more applications with the emerging ultra-high-definition video format, such as the 4K×2K format, where more diversified video sizes may co-exist in the video home networking environment.

Figure 2:
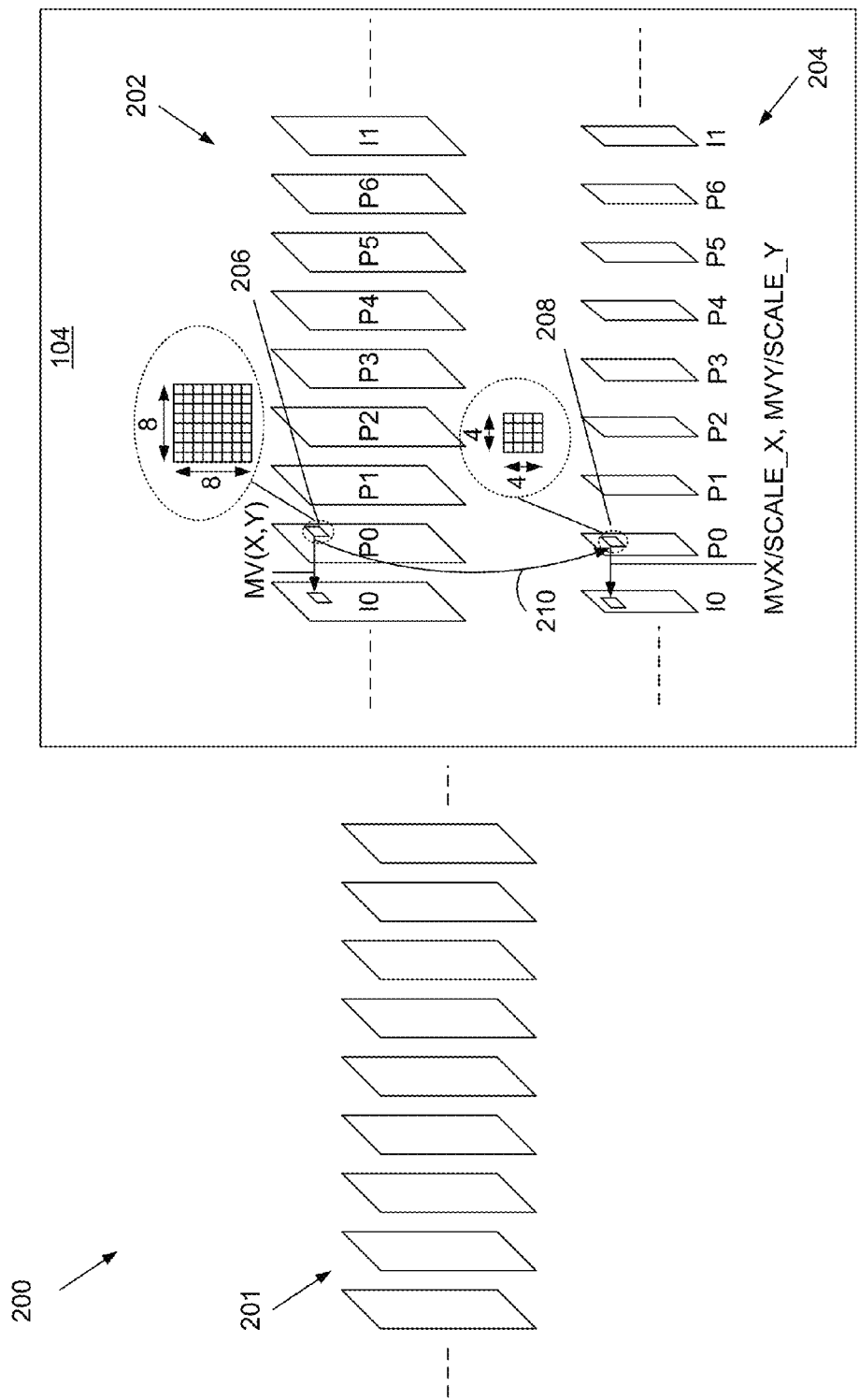
FIG. 2 is a schematic diagram that illustrates the generation of video streams of different picture sizes from an input video stream.

Reference is now made to FIG. 2, which shows an embodiment of a video coding method that shares motion vectors among two streams of different picture sizes. In certain embodiments of video coding systems involving differences in pictures sizes based on encoding of an input video, the down-scaled video is encoded by sharing motion search results with the original input video by applying operations such as scaling and median or weighted averaging to motion vectors of collocated macroblocks in the original input video.

For example, assume the size of the original input video is 1920×1080, and the down-scaled video size is 960×540. In this example, a motion search is performed in 1920×1080 video coding, and the resulting motion vectors and their associated macroblock partitions are used to generate the motion vectors and associated macroblock partitions of the down-scaled video without performing a motion search function in the down-scaled video. Assume in this example also that both the horizontal dimension and vertical dimension are down-scaled by a factor of two (2). In this example, a macroblock of 16×16 in the 1920×1080 video corresponds to a block of 8×8 in the downscaled 960×540 video, and a block of 8×8 in the 1920×1080 video corresponds to a block of 4×4 in the downscaled 960×540 video.

In FIG. 2, an input video 201 and a respective GOP (group of pictures) for plural produced streams (e.g., produced by the encoding engine 104) such as 1920×1080 video 202 and for 960×540 video 204 are shown. The input video 201 may comprise an uncompressed (non-compressed) video stream. Each picture of the 1920×1080 video 202 comprises plural macroblocks (e.g., 16×16 in size), as shown in part by an example 8×8 block (a quarter of a macroblock) 206 having a motion vector mv(x, y) for picture P0 referencing a corresponding block in picture 10, for example. Note that the picture rate of the input video 201 is the same as that of the video 202. Further, though shown with two generated streams, additional streams may be generated in parallel to the streams 202 and 204 in some embodiments. Also, each picture of the 960×540 video 204 comprises plural corresponding blocks of 4×4 size to each 8×8 block, such as 4×4 block 208 having a motion vector (mvx/scale_x, mvy/scale_y) referencing a corresponding block in picture 10, where scale_x and scale_y are scaling factors in the horizontal and vertical directions respectively (e.g., two (2) in this example) for deriving motion vectors. Each block, such as block 206, in the 1920×1080 video 202 may find a corresponding downscaled block, such as block 208, in the 960×540 video 204, which may be referred to herein also as a pair of collocated blocks in the original and downscaled video, where the location of the top-left corner of a block in the 1920×1080 video (x, y) is mapped to the location (x/2, y/2) of the top-left corner of the collocated block in the 960×540 video. Therefore the motion vector (e.g., mvx, mvy) associated with each partitioned block in the 1920×1080 video 202 can be mapped (as referenced by mapping reference line 210) to the collocated block (e.g., block 208) in the 960×540 video 204 by downscaling the motion vector by the same factor as used in downscaling the video picture size in the horizontal and vertical direction respectively (e.g., mvx/scale_x, mvy/scale_y, where both scale_x and scale_y equal two (2) in this example) in the above example.

In some embodiments, referring to FIGS. 3A-3D (which each figure shows an example of one 16×16 macroblock in the downscaled video and where each square block unit represents one luma sample as a simple illustration (with the understanding that different macroblock partitions are contemplated to be within the scope of the disclosure)), when the size of a collocated block in the downscaled video is not a legal or compliant partition size of the encoding video standard, such as the illegal size of a 2×2 block (only four 2×2 blocks of the macroblock are highlighted to avoid obscuring the drawing) in the downscaled video in AVC coding standard as illustrated in diagram 300A in FIG. 3A, a motion vector merge operation may be performed to merge the mapped motion vectors of the four 2×2 blocks (e.g., motion vectors 302A, 302B, 302C, 302D) to form a 4×4 block 304A (only one 4×4 block highlighted to avoid obscuring the drawing), which is a legal or compliant partition size for the AVC coding standard, as shown by diagram 300B. The merge operation may be a medium or a weighted average of the four motion vectors of the four 2×2 blocks, as reflected by resultant motion vector 302E of block 304A.

In some embodiments, after all the motion vectors are mapped to blocks of legal size in the downscaled 960×540 video 204 (FIG. 2), the partition of a macroblock of 16×16 in the 960×540 video 204 may be determined by checking the motion vectors of neighboring blocks to find out if a larger partition size may be formed. For example, and referring to diagram 300C of FIG. 3C, if all four 4×4 blocks 304A, 304B, 304C, and 304D in the 960×540 video 204 have the same motion vector, the 8×8 sub-partition can be applied to the 8×8 block in the AVC coding standard, as shown by 8×8 block 306 in diagram 300D of FIG. 3D. Furthermore if both the top left and top right 8×8 block use the 8×8 sub-partition, and they have the same motion vectors, and if the same applies to the bottom left and bottom right 8×8 blocks, the 16×8 partition may be selected for the macroblock. If the bottom left and bottom right 8×8 blocks have different motion vectors, the 16×8 partition cannot be selected for the macroblock. In other words, certain embodiments of a video coding method determine the largest possible legal partition size as the selected partition size for the downscaled video after merging the mapped motion vectors from the original video.

When sharing the motion vector search function, the downscaled video and the original video received at the electronic appliance normally share the same GOP structure. The downscaled video still uses its own reconstructed picture, which is in the same temporal location as the reconstructed picture of the original video, as the reference for its motion compensation. This prevents any drifting. Other than the motion vector search, the downscaled video may also share the intra mode decision, and/or the inter and intra mode decision for each coding unit or macroblock. The downscaled video processes its own encoding functions, such as transform, quantization, inverse quantization, inverse transform, reconstruction, loop filtering, and entropy coding, independent of the original video encoding process.

In some embodiments of video coding methods, the above scheme may be applied to encoding the downscaled video of different scale factors. When the downscale factor is not an even number, the macroblock boundaries of the downscaled video may not align with that of the original video. In this case, one 4×4 block in the downscaled video, for example, may have more than one 8×8 blocks in the original video that may be collocated with the 4×4 block when the original video is downscaled. One method to find the motion vector of the 4×4 block in the downscaled video is to use an average or median of all the mapped motion vectors of all collocated blocks in the original video.

The motion search sharing scheme may be extended to the case when the downscaled video is encoded in a different video coding standard from what is encoded for the original video. Some example constraints to such an operation may include the number of references and the temporal location of references may be different, which requires the temporal location of the reference picture selected by a motion search function for the original video comply with the coding standard of the downscaled video. This requirement may be met because all the video coding standards allow the picture preceding the current one as its reference for inter-prediction. The minimum partition size, motion vector resolution, and motion vector range of the downscaled video also need to comply with the coding standard by taking the average or median of motion vectors of the collocated blocks that compose the minimum partition size in the downscaled video, rounding the motion vector resolution when the mapped motion vectors from the original video have a higher resolution than the legal motion vector resolution of the downscaled video, or bounding the motion vector range if the mapped motion vector from the original video is beyond the legal motion vector range of the downscaled video. For example, the original video may be encoded in AVC while the downscaled video is encoded in MPEG-2. MPEG-2 has a minimum partition size of 16×8 and a motion vector resolution of half-pixel, while AVC has a minimum partition size of 4×4 and a motion vector resolution of quarter-pixel.

In some embodiments of a video coding method, the motion search sharing scheme may be applied to a real-time scalable video encoder (e.g., encoding engine 104), where different spatial layers may be encoded in real-time by the same encoder. The motion search results of the enhanced layer may be used to generate the motion vectors for the base layer, which is the picture of a lower resolution.

In some embodiments, the motion search sharing scheme may be applied between a spatially scaled video where an encoder encodes a 2D video of, for instance, 1920×1080, and a 3D video of a downscaled version, such as 960×540, at the same time using the same encoder. In this case the motion search of the lower resolution 3D video may use the downscaled motion vector from the 2D video of higher resolution.

Figure 4A:
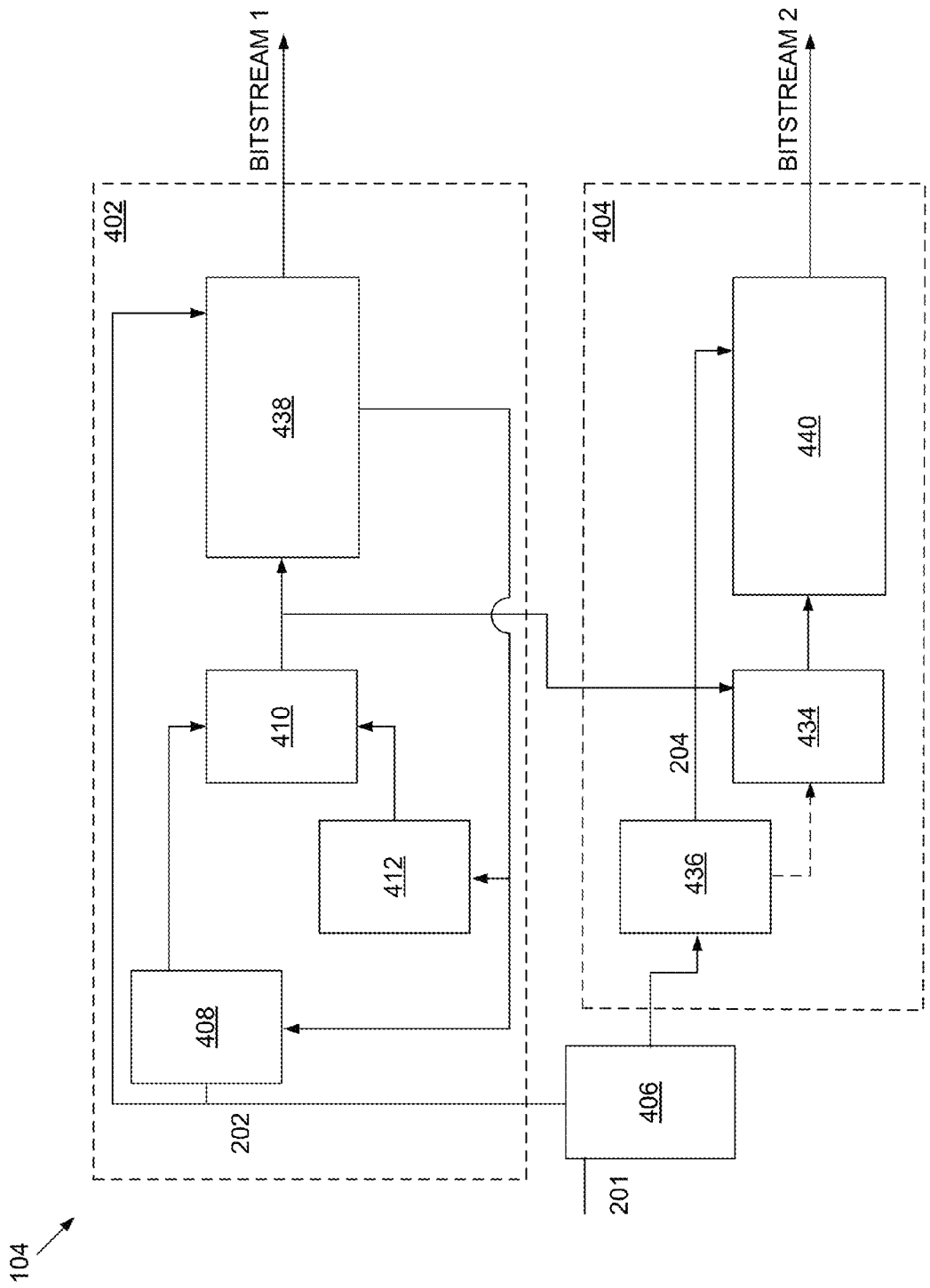
FIGS. 4A-4B are block diagrams that illustrate certain embodiments of an example encoding engine.
Figure 4B:
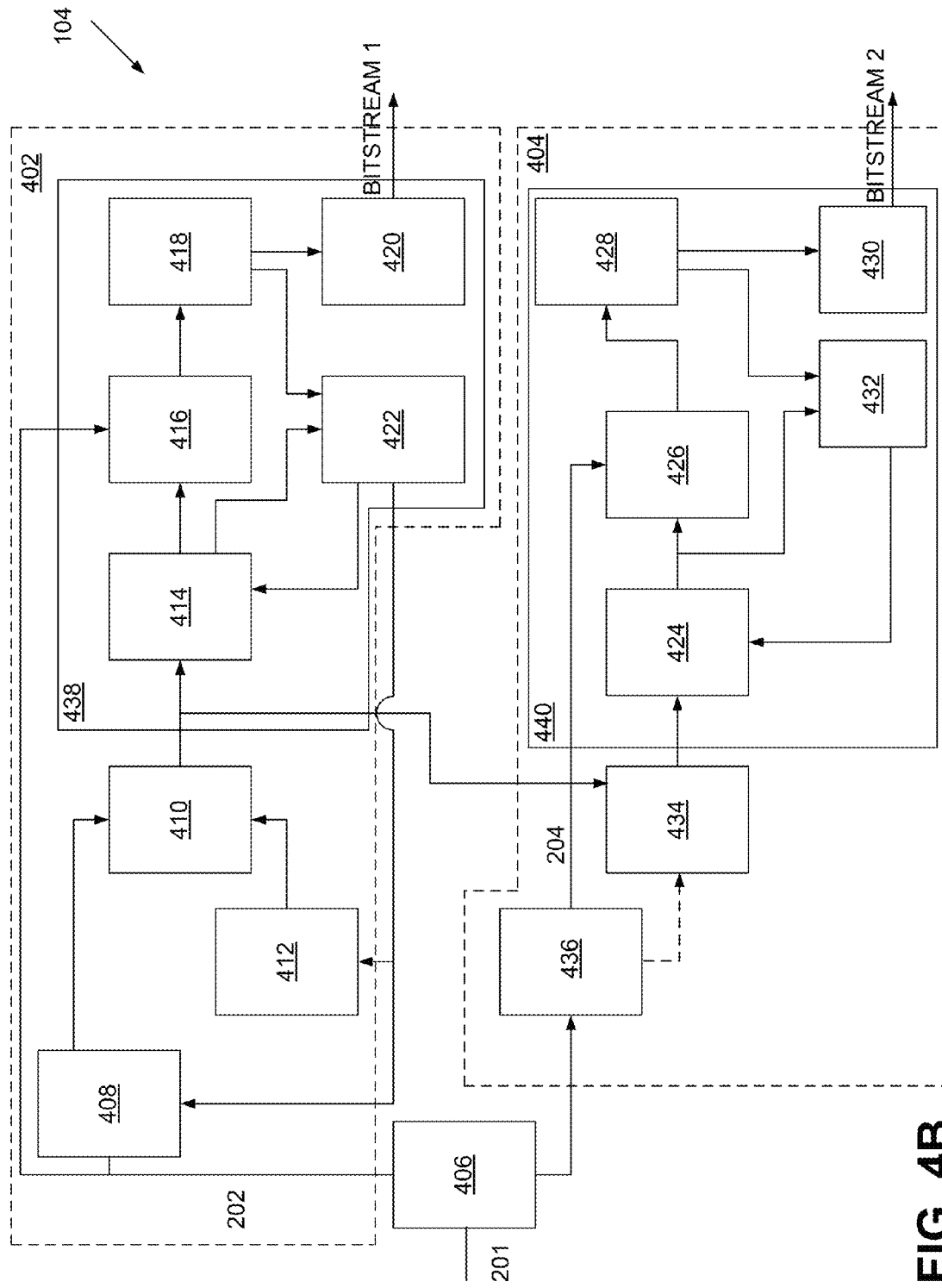

Attention is now directed to FIGS. 4A-4B, which illustrates an example video coding system embodied as a single encoding engine 104. In one embodiment, the single encoding engine 104 may be implemented in hardware, although some embodiments may include software (including firmware) or a combination of software and hardware. For instance, some embodiments may include a processor (e.g., CPU) that provides instructions and/or data to one or more of the logical units depicted in FIGS. 4A-4B. The example single encoding engine 104 comprises a first processing unit 402 and a second processing unit 404. It should be understood within the context of the present disclosure that although two processing units 402 and 404 are shown, the quantity is merely illustrative, and that certain embodiments may include additional processing units. The multiple processing units 402 and 404 generate a respective bitstream (e.g., "bitstream 1" and bitstream 2") corresponding to different picture sizes of the same input video. For purposes of illustration, the single encoding engine 104 is shown as generating two bitstreams. However, some embodiments of the single encoding engine 104 may be expanded to generate any number of bitstreams. The number of bitstreams may depend, for example, on the application executing on the electronic appliance housing the encoding engine 104.

Video is received at video input 406 (e.g., an interface). For instance, the video received at the input to the interface 406 may comprise the input video 201 shown in FIG. 2. The interface 406 implements a duplication function according to well-known methods, where the input video is divided into plural video streams (in this example, two (2)) that mirror the picture size of the input video 201. The plural streams (e.g., such as input picture size video 202 of FIG. 2) is output from the interface 406 and provided to each processing unit 402 and 404. At the first processing unit 402, the input picture size video 202 is provided to coding decision logic that includes such coding decisions as intra-mode decision logic 408, where the determination of prediction directions for macroblocks in intra-prediction mode are made, and inter/intra decision logic 410 for processing a given macroblock. Also shown is motion estimation (motion search) logic 412 that includes partitioning of the macroblock and their motion vectors. The single encoding engine 104 further includes additional processing logic 348 and 440, which (referring to FIG. 4B) may include motion compensation logic 414, 424 for inter-prediction, where the partitions and their associated motion vectors to retrieve are identified by a motion estimation (search) logic 412.

As shown in FIG. 4A, another of the plural input picture size video output by the interface 406 is provided to the second processing unit 404, and in particular, to the spatial scaler logic 436. The spatial scaler logic 436 performs spatial scaling and outputs video of a reduced picture size. The amount of spatial scaling may be determined by a processor (e.g., CPU) or based on user input, for instance. In other words, the spatial scaler logic 436 downscales the original input video to a desired size or resolution. The reduced picture size video is provided to additional processing logic 440, described below in conjunction with FIG. 4B. In some embodiments, a combination of temporal scaling and spatial scaling may be performed. The output of the spatial scaler logic 436 may comprise the reduced picture size video 204 (FIG. 2). Video coding information includes motion vectors, motion vector search area, mode decisions, etc., and as explained below, is shared among the first and second processing units 402 and 404 to encode the video streams 202 and 204. In one embodiment, the motion vectors, motion vector search area, and/or mode decisions determined for the first processing unit 402 are provided to derivation logic 434.

In embodiments where spatial scaling is implemented to derive a reduced size stream for encoding, the spatial scaler logic 436 performs spatial downscaling as indicated above, and the derivation logic 434 performs motion vector mapping, motion vector scaling, etc. For instance, in one embodiment, the derivation logic 434 performs the mapping of blocks and motion vectors among the different sized pictures, scales the motion vectors and performs additional processing to merge blocks to maintain compliance with a given coding standard and finds the largest legal partition size as the selected partition size for the downscaled video after merging the mapped motion vectors of the video encoding process performed by the first processing unit 402. The derivation logic 434 and spatial scaler logic 436 share information either directly or indirectly (e.g., via CPU intervention), as represented by the dashed line between 436 and 434. For instance, in one embodiment using direct transfer (without CPU intervention), a scale factor is passed directly from the spatial scaler logic 436 to the derivation logic 434. The spatial scaler logic 436 performs the spatial scaling to provide the reduced picture size video (e.g., 204), and encoding of the reduced picture size video (204) ensues based on the derived video coding information (e.g., motion vectors) from the first processing unit 402 and based on information (e.g., picture size, bit rate, scale factor) passed from the spatial scaler logic 436 to the derivation logic 434. Although the various algorithms and/or methods are described as being performed at least in part in the derivation logic 434 in conjunction with the spatial scaler logic 436, it should be appreciated that one or more of the aforementioned functions may be performed by other logic or distributed among a plurality of different logic in some embodiments.

During the encoding process, a current frame or picture in a group of pictures (GOP) is provided for encoding. The current picture may be processed as macroblocks or coding units in the emerging video coding standard HEVC, where a macroblock or a coding unit corresponds to, for example, a 16×16 or 32×32 block of pixels in the original image. Each macroblock may be encoded in intra-coded mode or in inter-coded mode for P-pictures, or B-pictures. In inter-coded mode, the motion compensated prediction may be performed by the additional processing logic 438 and 440, such as corresponding motion compensation logic 414 and 424 (FIG. 4B) in each processing unit 402 and 404, respectively, and may be based on at least one previously encoded, reconstructed picture.

Referring to FIG. 4B and further explaining additional processing logic 438 and 440, for each processing unit 402, 404, the predicted macroblock P may be subtracted from the current macroblock to generate a difference macroblock by logic 416, 426 for each bitstream, and the difference macroblock may be transformed and quantized by the corresponding transformer/quantizer logic 418, 428 for each bitstream. The output of each transformer/quantizer logic 418, 428 may be entropy encoded by the corresponding entropy encoder logic 420, 430 and output as a compressed bitstream that corresponds to a different bitrate.

The encoded video bitstreams (e.g., "bitstream 1" and "bitstream 2") comprise the entropy-encoded video contents and any side information necessary to decode the macroblock. During the reconstruction operation for each of the bitstreams, the results from the corresponding transformer/quantizer logic 418, 428 may be de-quantized, inverse transformed, added to the prediction, and loop filtered by a corresponding inverse quantizer/inverse transformer/reconstruction logic 418, 428 to generate a reconstructed difference macroblock for each bitstream.

In this regard, each bitstream is associated with a corresponding processing unit 402, 404 which include residual computation logic 416, 426, each configured to generate residuals and subsequently, the quantized transformed coefficients. Note, however, that different quantization parameters are applied. Each processing unit 402, 404 further comprises reconstruction logic 422, 432 coupled to the inverse quantizer/inverse transformer logic 418, 428, where each reconstruction logic 422, 432 is configured to generate corresponding reconstructed pixels. As shown, the reconstruction logic 422, 432 perform the reconstruction of decoded pixels at different picture sizes depending on the corresponding quantization parameter that is applied. Note that one or more of the functionality involving the various logic described in association with FIGS. 4A-4B may be combined into single logical units, or further distributed among additional logical units.

Note that the various embodiments disclosed may be applied to various video standards, including but not limited to, MPEG-2, VC-1, VP8, and HEVC, which offers more encoding tools that may be shared. For example, with HEVC, the inter-prediction unit size can range anywhere from a block size of 4×4 up to 32×32, which requires a significant amount of data to perform motion search and mode decision.

Figure 5:
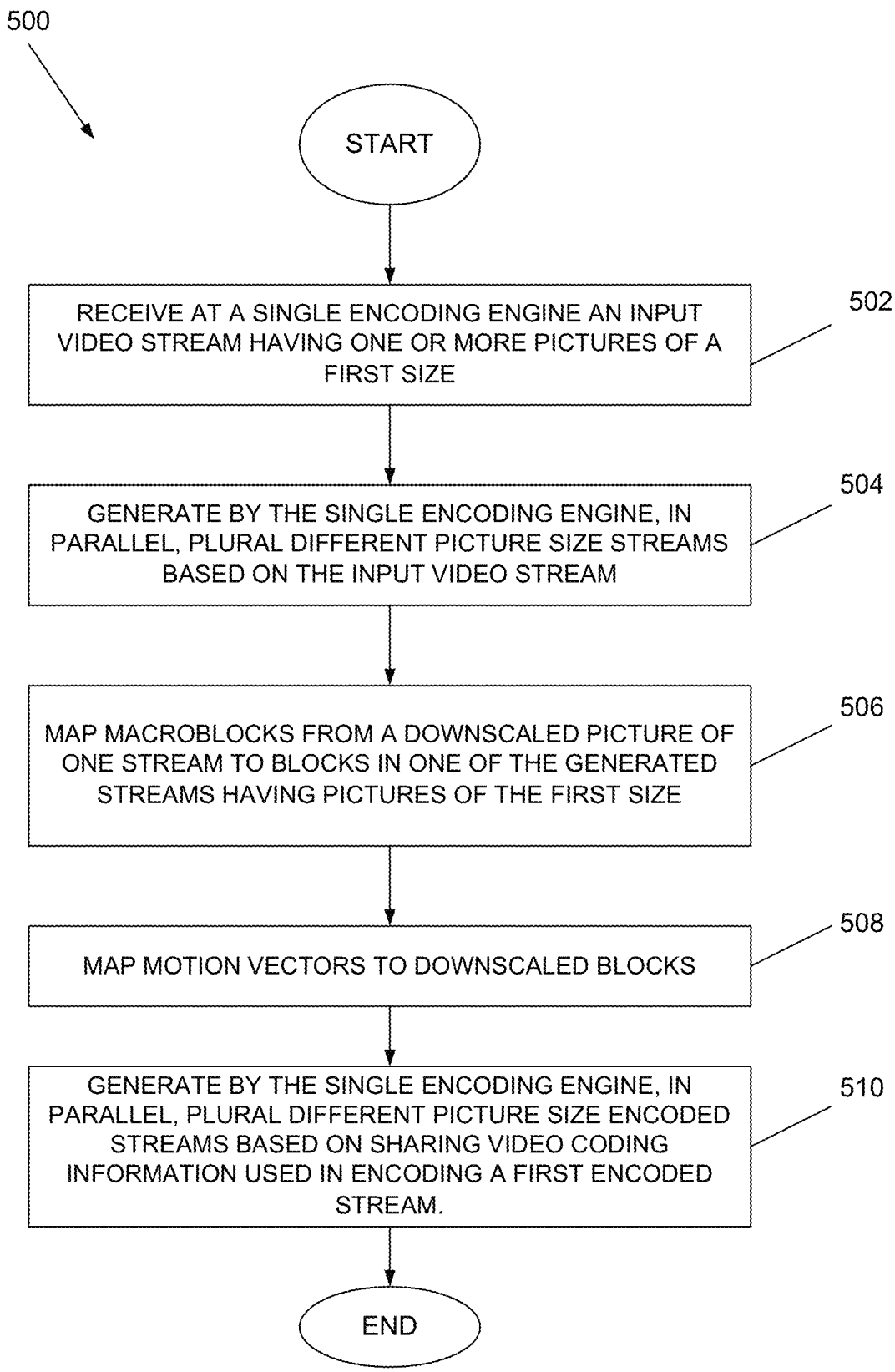
FIG. 5 is a flow diagram that illustrates one embodiment of an example video coding method.

It should be appreciated within the context of the present disclosure that one embodiment of a video coding method 500, depicted in FIG. 5 and implemented in one embodiment by a single encoding engine (e.g., encoding engine 104), comprises, receiving at a single encoding engine an input video stream having one or more pictures of a first size (502). For instance, the input video stream may be an uncompressed stream (e.g., input video stream 201, FIG. 2). The method 500 further comprises generating by the single encoding engine, in parallel, plural streams of different picture sizes (504). In other words, the interface 406 (FIG. 4A and FIG. 4B) duplicates the input video stream and generates plural (e.g., two in this example) streams corresponding to video stream 202. The spatial scaler logic 436 generates a reduced picture size stream (e.g., video stream 204), and provides the stream to additional processing logic 440. Also, the first processing unit 402 provides motion vector and/or mode information to the derivation logic 434, which is used to encode the reduced picture size stream. In one embodiment, the method 500 maps the macroblocks from the downscaled pictures of one generated stream (e.g., reduced picture size stream) to blocks in another generated stream (e.g., the pictures having the first picture size of the input stream) (506), and maps motion vectors of the each of the plural blocks of the input video stream to the plural downscaled blocks of the second encoded stream, the mapped motion vectors of the second encoded stream based on motion vectors used in generating the first encoded stream adjusted by the defined scaling factor (508). The method 500 further comprises generating plural encoded streams, a first of the encoded streams comprising one or more pictures of the first size and a second of the encoded streams comprising one or more pictures of a second size that is smaller than the first size, the encoding of the second stream based on sharing video coding information used in encoding the first encoded stream (510). In some embodiments, the method 500 comprises merging the mapped motion vectors in response to a non-compliant block size to form a compliant block size. The method 500 may further comprise in some embodiments determining a partitioning of each macroblock or coding unit containing the compliant mapped blocks based on neighboring mapped motion vectors and averaging, or applying a median operation to, the mapped motion vectors when the boundary of the macroblock in the downscaled encoded stream is not aligned with that in the input video stream. It should be appreciated within the context of the present disclosure that one or more of the described logical functions may be omitted in some embodiments, or additional logical functions may be included. For instance, sharing of mode information is also contemplated to be within the scope of certain embodiments of the method 500.

The video coding system may be implemented in hardware, software (e.g., including firmware), or a combination thereof. In one embodiment(s), the video coding system is implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In embodiments, where all or a portion of the video coding system is implemented in software, the software is stored in a memory and that is executed by a suitable instruction execution system (e.g., a computer system, including one or more processors, memory encoded with encoding software/firmware and an operating system, etc.).

Any process descriptions or blocks in flow diagrams should be understood as representing modules, segments, or portions of code which include one or more executable instructions for implementing specific logical functions or steps in the process, and alternate implementations are included within the scope of the disclosure in which functions may be executed out of order from that shown or discussed, including substantially concurrently or in reverse order, depending on the functionality involved, as would be understood by those reasonably skilled in the art.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method, comprising:
    receiving at a single encoding engine an input video stream having one or more pictures of a first resolution; and
    generating by the single encoding engine, in parallel, plural encoded streams, a first of the encoded streams comprising one or more pictures of the first resolution and a second of the encoded streams comprising one or more pictures of a second resolution that is smaller than the first resolution, the encoding of the second stream based on sharing video coding information used in encoding the first encoded stream, wherein a plurality of first blocks of the first encoded stream are downscaled by a scaling factor to derive a plurality of second blocks of the second encoded stream;
    mapping a plurality of first motion vectors of the first blocks to a plurality of second motion vectors of the second blocks, the second motion vectors each corresponding to one of the first motion vectors adjusted by the scaling factor; and
    partitioning at least one of a macroblock or a coding unit of the second encoded stream into one or more partitions, the at least one of the macroblock or the coding unit comprising a plurality of the second blocks, the at least one of the macroblock or the coding unit partitioned by:
        identifying a plurality of neighboring second blocks within the at least one of the macroblock or the coding unit having equal second motion vectors; and
        combining the neighboring second blocks having the equal second motion vectors within a partition of the one or more partitions.

2. The method of claim 1, wherein the video coding information comprises motion vector search results used for inter prediction.

3. The method of claim 2, wherein the motion vector search results comprise motion vectors, partitions of one coding unit, motion vector search range, or any combination thereof.

4. The method of claim 2, wherein a motion vector search is performed for the first encoded stream and the resulting motion vectors and associated coding unit partitions are used for the generating of the second encoded stream without performing a motion vector search function for the second encoded stream.

5. The method of claim 2, wherein a vertical and horizontal dimension of each of the first are downscaled by the scaling factor to derive the second blocks of the second encoded stream.

6. The method of claim 1, further comprising merging the mapped motion vectors in response to a non-compliant block size to form a compliant block size.

7. The method of claim 6, further comprising determining a partitioning of each macroblock or coding unit containing the compliant mapped blocks based on neighboring mapped motion vectors.

8. The method of claim 1, further comprising averaging, or applying a median operation to, the mapped motion vectors when the boundary of each macroblock corresponding to the downscaled encoded stream is not aligned with that in the input video stream.

9. The method of claim 1, wherein encoding the second stream based on sharing video coding information further comprises encoding the second stream based on the selection between inter prediction and intra prediction applied when encoding the first stream.

10. The method of claim 1, wherein the video coding information comprises motion vector search results, an intra prediction mode used for intra prediction, a selection between inter prediction and intra prediction for a coding unit, or any combination thereof.

11. The method of claim 10, further comprising generating one or more additional encoded stream in parallel with generating the first and second encoded streams, the generating based on the shared video coding information.

12. The method of claim 1, wherein the generating occurs in real-time.

13. The method of claim 1, further comprising processing some coding functions of the first and second encoded streams independently of each other.

14. The method of claim 1, wherein the first encoded stream is generated according to a different video coding standard than the second encoded stream.

15. The method of claim 1, wherein the first encoded stream comprises an enhanced layer stream and the second encoded stream comprises a base layer stream.

16. A system comprising:
    a single encoding engine configured to:
        receive an input video stream having one or more pictures of a first resolution;
        generate in parallel plural encoded streams, the a first encoded stream of the encoded streams comprising one or more pictures of the first resolution and a second of the encoded streams comprising one or more pictures of a second resolution that is smaller than the first resolution, the encoding of the second stream based on sharing video coding information used in encoding the first encoded stream
        map a plurality of first motion vectors of the first blocks to a plurality of second motion vectors of the second blocks, the second motion vectors each corresponding to one of the first motion vectors adjusted by the scaling factor; and
        partition at least one of a macroblock or a coding unit of the second encoded stream into one or more partitions, the at least one of the macroblock or the coding unit comprising a plurality of the second blocks, the single encoding engine configured to partition at least one of the macroblock or the coding unit by:
            identifying a plurality of neighboring second blocks within the at least one of the macroblock or the coding unit having a same second motion vector; and
            combining the neighboring second blocks having the same second motion vector within a partition of the one or more partitions.

17. The system of claim 16, wherein the video coding information comprises motion vector search results, an intra prediction mode used for intra prediction, a selection between inter prediction and intra prediction for a coding unit, or any combination thereof.

* * * * *